United States Patent Office 2,852,161
Patented Sept. 16, 1958

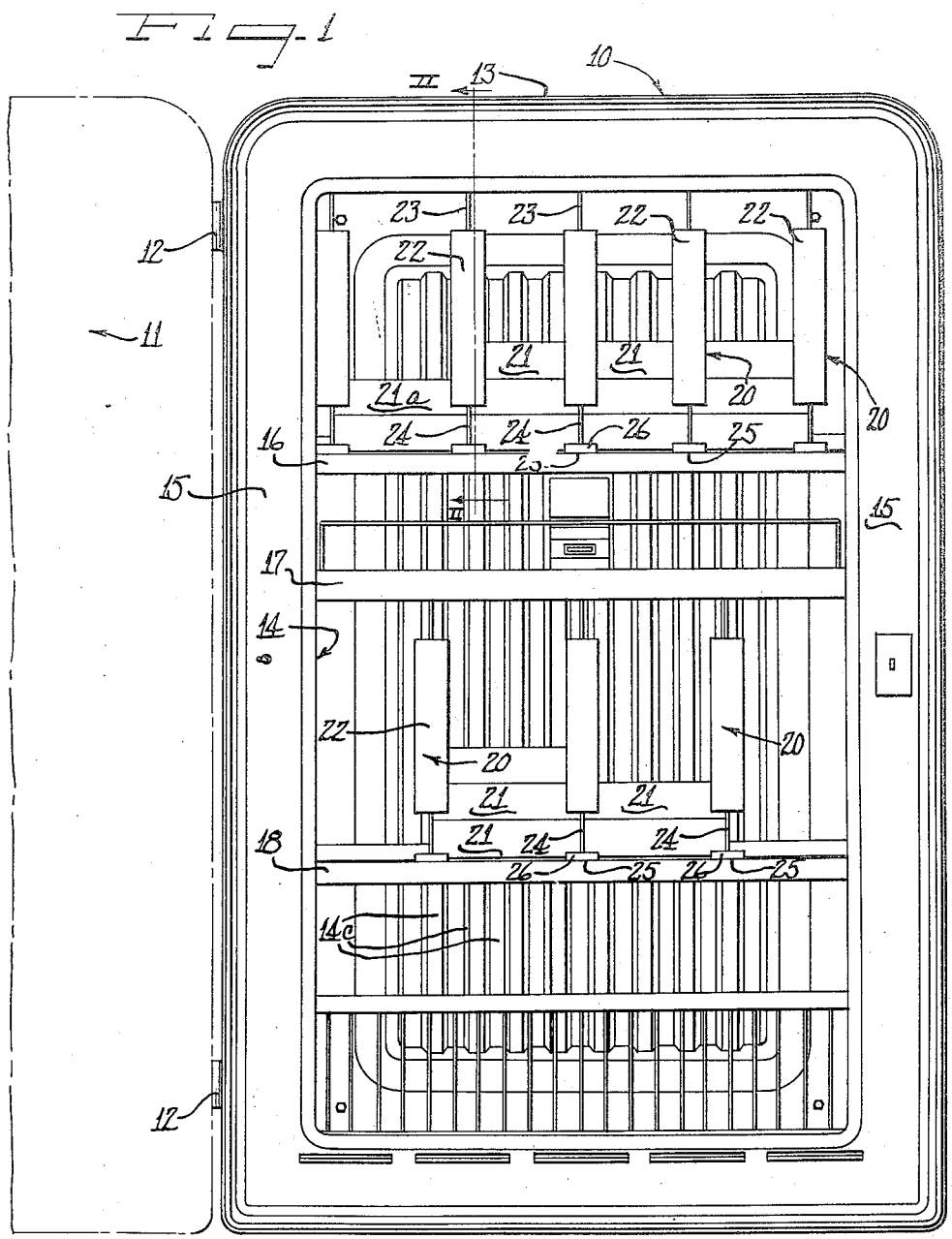

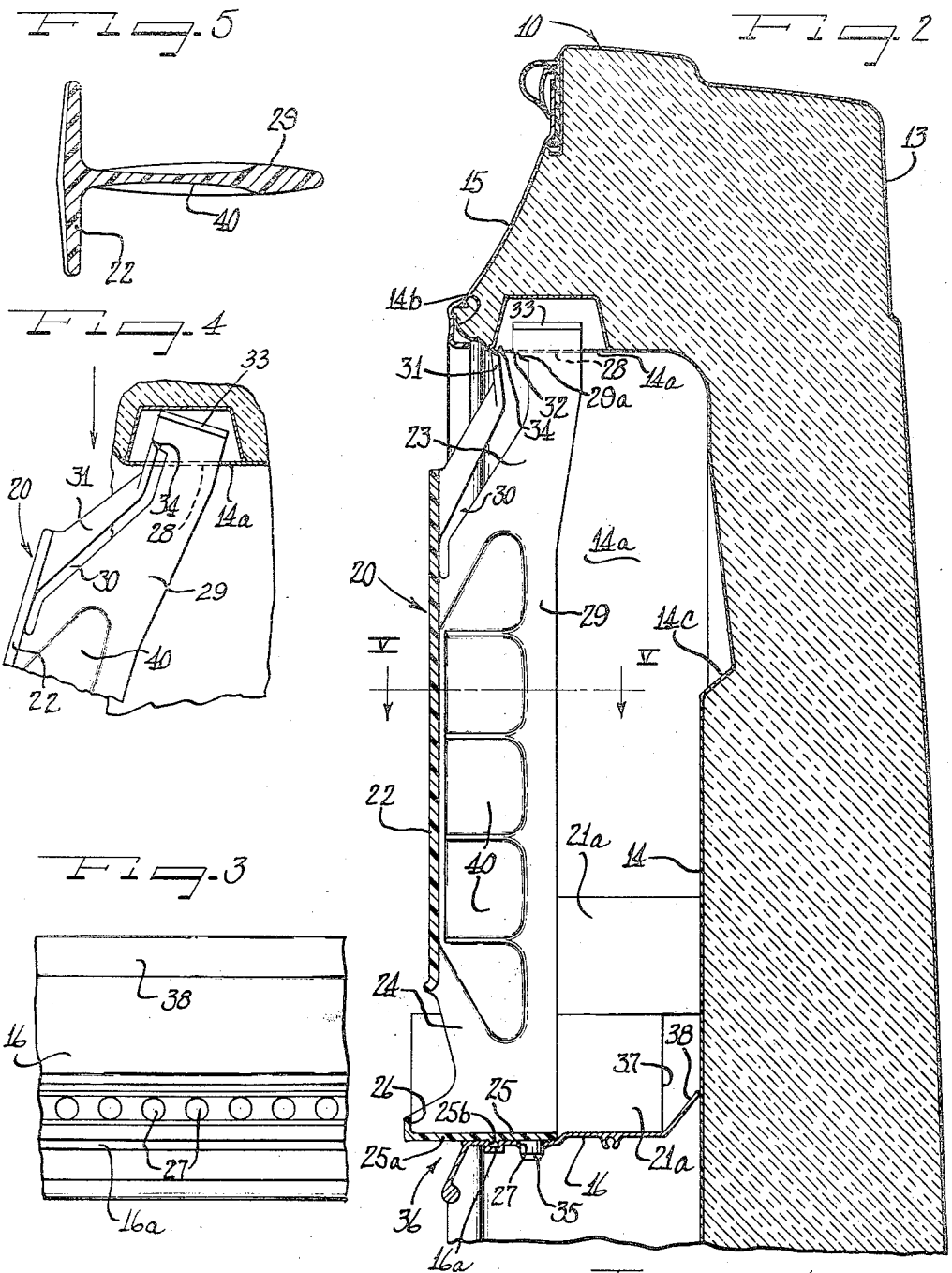

2,852,161

FREEZER INNER DOOR STRUCTURE

George C. Foerstner, Amana, and Robert E. Moore and Warren R. Bower, Cedar Rapids, Iowa, assignors to Amana Refrigeration Inc., Amana, Iowa, a corporation of Iowa Application October 9, 1953, Serial No. 385,095

8 Claims. (Cl. 221—311)

The present invention relates to the construction of doors for food freezers, refrigerators and the like. More particularly, the invention relates to food storage structure positioned on the inside surface of the freezer door for the storage and dispensing of packaged foods.

Applicants are aware of prior art food storage units such as refrigerators which utilize a food storage apparatus secured to the door. However, to their knowledge, all of these prior art structures dealt with the storage of such items as bottled goods, and similar relatively upright and narrow types of food packages. The prior art shelves have been relatively narrow and, in fact, to our knowledge have not exceeded three inches in depth.

Increased popularity of the low temperature food freezing method of preserving food has placed on the market a type of food package entirely different from that heretofore known in household food storage. For example, on the modern market, a great many vegetables, fruits and similar seasonal food products are now packaged in opaque paper, or similar cartons, having a width of substantially four inches, a varying depth which averages approximately an inch and one-half, and a varying length which varies to a substantial extent depending upon the food being packaged. In the prior art food freezers of the type with which we are aware, no provision other than the usual, and rather unsatisfactory, shelf type storage within the compartment of the freezer has been made for this new type of package.

While, of course, the narrow compartments provided in the doors of prior art food freezers and refrigerators are capable of holding such packages when placed on edge, it is clear that only very nominal amounts of such materials may be stored in the door since the vertical and lateral dimensions of the package are quite large. However, through the present invention, an entirely different concept in the storage of food in the freezer door has been provided by which a maximum amount of food storage space is provided without rendering the door structure substantially more complex than those already known in the prior art. Further, through the use of the present invention the storage of food is systematized so that a continual first-in-first-out food storage system is automatically and conveniently provided.

The invention includes the provision of a deep-drawn inner door liner or shell having a compartment depth slightly greater than four inches. The liner is rectangular in shape and hence a constant depth food compartment is provided throughout substantially the entire width of the door in a manner unknown in the prior art.

It has been discovered that food packages in the frozen food industry are provided with one standard dimension. This dimension is the four inch width dimension and although it appears that the depth and the length of frozen food packages vary to a substantial extent, nevertheless the four inch dimension is retained almost universally. By providing an inner door having a depth slightly greater than four inches, it is thus possible to store the above mentioned four inch frozen food packages on their sides with the thickness dimension in the vertical plane and the length dimension in a horizontal plane. Such an arrangement is found in the copending application of George C. Foerstner, Serial No. 311,854, filed September 27, 1952, now U. S. Patent No. 2,728,623, issued December 27, 1955.

By thus stacking the packages on the flat side, it is possible to utilize substantially all the area of the freezer door for efficient food storage. While this basic concept is shown in the above identified copending application, several factors of importance should be noted relative to the effective use of such a storage system. In the first place, provision must be made for preventing the disoldging of food packages upon the opening or the closing of the door. Thus, a bar or similar type retaining means must be provided across the front of the stored packages to prevent them from falling during the usual course of opening and closing the freezing compartment.

In the second place, the provision of the usual retaining means in the form of a basket type of enclosure or similar retaining means, requires that the packaged food first placed in the door compartments be utilized last since the food first placed in the door would naturally be positioned on the bottom of the compartments where it could not be removed until last. While it is of course possible to reshuffle the packages every time that it is desired to use one, such a procedure is undesirable since it requires a substantial amount of time during which the freezer compartment must be open, and it further is an obvious source of annoyance to the user.

Applicants have, in the present invention, provided an improved storage structure for use with doors of food freezer cabinets which provides for the extremely efficient side stacking of food packages, while at the same time providing for retention of the packages securely within the door compartments. Further, the structure of the present invention provides a dispensing means of simplified, yet widely adjustable type which automatically disseminates, without reshuffling, the oldest frozen food of the particular type chosen by the user. Thus, an automatic, first-in-first-out food control is provided which provides a maximum amount of storage space without requiring undue manipulation of the food packages.

It is therefore an object of the present invention to provide a novel food storage apparatus for use with food freezer doors.

A further object of the present invention is to provide a frozen food package storing and dispensing apparatus for positioning on the door of a food freezer.

Yet another object of the present invention is to provide a simplified first-in-first-out food freezer inventory control structure.

Yet another object of the present invention is to provide a novel retaining means for maintaining parcels in stacked relation within the door of a food freezer or the like.

Yet another object of the present invention is to provide a novel divider apparatus for association with food freezer doors, and which is adjustable relative to the door to provide a plurality of different food package compartment sizes.

A feature of the present invention is a compartment divider provided with a self-contained divider positioning mechanism capable of maintaining said divider in an adjusted position in said door.

Another feature of the present invention is the provision of a food storage compartment having a disseminating slot at the bottom thereof and an inclined package guide adjacent thereto for positioning food packages adjacent said slot for ready removal therethrough.

Other features and objects of the present invention will of course become apparent to those skilled in the art from a consideration of the attached drawings in which a preferred embodiment of the present invention is shown by way of illustration only.

On the drawings:

Figure 1 is an elevational view of a food freezer door illustrating the installation of the structure of the present invention therein;

Figure 2 is an enlarged cross sectional view taken along the line II—II of Fig. 1 and further illustrating the applicants' novel storage apparatus;

Figure 3 is a partial plan view of the package holding shelf of the present invention;

Figure 4 is a partial elevation view showing the method of installing the dividers of the present invention; and Figure 5 is a cross sectional view of a divider taken along the line V—V of Fig. 2.

As shown on the drawings:

As may be seen from Fig. 1, a door 10 of conventional peripheral contour is provided for cooperation with the compartment of an upright food freezer 11 through the hinges 12. The door 10 comprises an outer shell 13 which is securely braced by thermally non-conductive members to an inner lining shell 14. The inner and outer shells are decoratively and thermally separated further by the breaker strip 15 which encircles the periphery of the door between the edges of said shells.

The above described freezer compartment structure may be of conventional design as far as peripheral dimensions are concerned. However, the rectangular inner liner 14 as used in the present invention is constructed of a depth which is slightly greater than four inches. Thus, as viewed in Fig. 2, the side walls 14a of the liner 14, including the peripheral flange 14b, provide a depth slightly greater than four inches. Within this four inch cavity a plurality of shelves 16, 17 and 18 are provided for supporting packaged foods and for supporting dividers 20 arranged for the segregation and retention of food packages 21.

Each of the dividers 20 comprises an elongated barrier or bar having a substantially T-shaped cross section as shown in Fig. 5. As may be seen, however, from Fig. 2, the cross bar or retaining flange 22 of the T extends throughout only a mid portion of the divider 20 leaving an uncrossed portion 23 at the top thereof and a second uncrossed portion 24 at the base thereof, for purposes which will be described below.

A flat base member or platform 25 is provided at the lower end of each divider and extends, as may be seen from Fig. 1, to substantially the same width as the cross bar 22. The bottom surface 25 is flanged at 26 to prevent outward movement of the lowermost package 21 without an intentional manual effort. A guide or locating pin 35 and a tongue 25b are provided on the bottom surface of the platform 25 for cooperation with the aperture 27 and groove 16a in the shelf 16, and operate to prevent any rotation or lateral movement of the platform 25 relative to the shelf 16.

The dividers 20 are positioned in the inner liner 14 in an adjustable manner. This is accomplished through the provision of a large number of apertures 27 in the lower shelves 16 and 18 and a corresponding number of rectangular slots 28 in the upper side wall 14a of the inner liner and in the bottom of the shelf 17. The leg 29 of each of the dividers 20 is provided with a slot 30 thereby providing an integral, upwardly extending abutment finger 31.

As may be seen from Figs. 2 and 4, the upper end of the leg 29 is provided with an overhanging lip portion 32 which is separated from the abutment finger 31 and which extends in an overhanging relation thereto sufficient that deflection of the finger 31 toward the right as viewed in Fig. 4 until the finger abuts the portion 29a will cause the finger 31 to lie completely under the overhanging lip 32.

The finger 31 and the leg 29 of the divider 20 are preferably provided with substantially identical thicknesses, so that when the finger 31 is abutted against the portion 29 the entire upper end 33 of the divider 20 may be moved upwardly through the elongated slot 28 in the manner shown in Fig. 4. However, when the finger 31 is in the position shown in Fig. 2 relative to the portion 29, the divider 20 is prevented from moving upwardly by the abutment 34 on the end of the finger 31. Thus, the abutment 34 acts against the side wall 14a, or a similar portion of the shelf 17 to prevent upward movement of the divider 20 until such time as the finger 31 is positioned under the lip 32.

It will thus be seen that a divider 20 may be inserted between the shelves 17 and 18, or between the top wall 14a and the shelf 16 of the door liner by deflecting the finger 31 into abutment with the leg portion 29a, inserting the upper end 33 of the divider 20 in the slot 28, moving the divider upwardly until the guide pin 35 on the bottom flange 25 thereof can pass over the shelf 16 or 18 to a position over an aperture 27, and then moving the entire divider 20 downwardly, inserting the pin 35 and the tongue 25b in the selected aperture 27 and the groove 16a, respectively. When the divider 20 is thus moved downwardly, the finger 31 is moved clear of the aperture 28 and is permitted to spring outwardly into the position shown in Fig. 2, in which the abutment surface 34 prevents upward movement of the divider 20 until such time as the finger 31 is again deflected into contact with the leg member abutment 29a. Thus the divider 20 is securely maintained in the slots 28 and the aperture 27 until such time as it is desired to make a further adjustment of the position of the dividers.

In practice, it is desirable that a very large number of closely spaced apertures 27 and slots 28 be provided in the compartment shelves. Under such circumstances it is then possible to provide a plurality of dividers 20 in various positions along the shelves to accommodate food packages 21 having varying lengths. Such an arrangement may be seen in Fig. 1 wherein the food packages 21a are shown to be substantially longer than the packages 21. By providing a relatively large number of dividers 20 with each freezer unit, it is therefore possible to utilize the freezer door to accommodate a large variety of package types, regardless of the food packager. Thus, even though the various packaging companies provide different length and width dimensions, the standard use of the four inch dimension permits the maximum utilization of space when a divider system such as above described is incorporated in the freezer door.

The novel first-in-first-out inventory control system is provided in the present invention through the provision of the gaps 23 and 24 in the cross bar or retaining flange 22 of the divider 20. The elimination of the cross bar 22 permits, as may be seen from Fig. 2, the edgewise removal of packages 21 from the bottom of the package stacks. The removal of the bottom package is facilitated by providing an overhanging portion 25a on the flange 25 so that the lowermost package 21 may be moved toward the left as viewed in Fig. 2 above the space 36. The user's fingers may then be positioned under the left hand edge of the package 21 and the package lifted sufficiently to pass over the upwardly turned flange 26. Since the fingers of the user may thus readily be brought to bear against the bottom surface of the lowest package 21, it is a simple matter to apply the necessary force to lift the package 21 over the flange 26 and outwardly away from the inner shell 14.

When the lowest package 21 is removed as above described, the next succeeding package drops downwardly behind the cross bar 22 of the associated dividers. On its movement downwardly, the right hand edge 37 strikes against the inclined surface 38 of the shelf 16. The inclination of the surface 38 causes the lowermost package 21 to be moved toward the left by weight of the packages stacked thereabove. This leftward movement positions the lowermost package 21 against the vertical flange 26 in position for its withdrawal as above described. However, since the flange 26 provides a positive abutment, the packages cannot be dislodged from the storage compartment of the door inadvertently through opening or closing of the door.

Thus, it will be seen that as the user stores food packages between the dividers by placing the packages sidewise through the open portions 23 at the top of the dividers 20, the lowermost, or first stored package, is the one next used since removal of the packages is accomplished through the lowermost opening 24 in the cross bars 22. Under this system, the user is automatically provided with a foolproof means for assuring that packaged food is not stored indefinitely in the freezer while later-stored packages of the same type of food are consumed.

It is to be understood that various types of materials may be utilized in the dividers 20 and in shelves 16, 17 and 18, as well as in the inner shell 14. However, it has been found that plastics of the high impact polystyrene type, such as Dow Chemical Company's Styron 475, Koppers 305, or similar polystyrene compounds, are very satisfactory for dividers. These plastics have a very high resistance to impact shock while providing a sufficient resiliency to permit substantially unlimited flexing of the finger 31 without fracture. Further, these plastics are readily colored to provide pleasing decorative appearance, are odorless, tasteless and unaffected by low temperatures.

Likewise, the shelves and liner shell 14 may be made of plastic. However, in order to minimize the expense it is preferred that the structural elements such as shelves, be manufactured of anodized aluminum, thereby providing decorative colors, and that the inner shell 14 be constructed of deep drawn steel, ribbed as at 14C, to provide a door structure having the maximum rigidity and providing ample air circulation behind and around the food packages.

It is to be understood that the apertures 27 may be of any configuration desired, and may, for example, be rectangular in substantially the same manner as the slots 28 provided at the upper ends of the dividers 20. Likewise, while a design configuration has been shown on the sides of the dividers 20, as at 40, it is to be understood that the exact configuration of this design is immaterial. The main function of the cavities 40 is to maintain the major portion of the edges of the stored packages somewhat separated from the main body of the divider. Thus, the danger of the packages 21 becoming bonded to the dividers by frost is substantially eliminated. However, as above noted, various ribbed effects may be provided for accomplishing this purpose while at the same time providing a pleasing and decorative appearance.

It will thus be seen that we have provided a novel and greatly improved food storage compartmenting structure for food freezers, which structure permits a maximum of storage capacity and a maximum of efficiency in food utilization. Through the use of the novel structure herein disclosed, a first-in-first-out inventory control is automatically provided and a wide range of package sizes may be accommodated without structural changes in the freezer door proper.

It is to be understood that modifications and variations may be made in the disclosed structure without departing from the novel concepts of the present invention and it is, accordingly, intended that the scope of the present invention be limited solely by the scope of the hereinafter appended claims.

We claim as our invention:

1. In combination with a recessed door, a horizontal shelf, at least two vertically disposed dividers adjustably associated with said shelf and said door and removably secured to said shelf whereby the horizontal distance therebetween may be adjusted, each of said dividers having a flange therealong at the edge thereof remote from the door whereby packages may be retained between the dividers and against said door, means for inserting packages behind said flanges at the top of the dividers, and means at the bottom of the dividers permitting removal of stacked packages one by one, said last named means including a cut-out portion in each of said flanges adjacent the bottom thereof, a package-displacing inclined portion on said shelf adjacent said door for moving the lowermost package outwardly away from said door through said cut-out portion and into position for manual removal, platform means at the bottom of each said divider providing an extension of said shelf projecting outwardly away from said door beyond said flanges and supporting the lateral ends only of the bottom package and abutment means on said platform at the edge thereof remote from the door whereby the lowermost package is prevented from outward movement along said platform and away from said door beyond a predetermined dispensing position in which both the bottom and top of the package projects for grasping.

2. In combination with a recessed door, a horizontal shelf, at least two vertically disposed dividers adjustably associated with said shelf and said door and removably secured to said shelf whereby the horizontal distance therebetween may be adjusted, each of said dividers having a flange therealong at the edge thereof remote from the door whereby packages may be retained between the dividers and against said door, means for inserting packages behind said flanges at the top of the dividers, and means at the bottom of the dividers permitting removal of stacked packages one by one, said last named means including a cut-out portion in each of said flanges thereof, platform means at the bottom of each said divider providing a horizontal extension of said shelf projecting outwardly away from said door beyond said shelf and supporting the lateral ends only of the bottom package, and vertically projecting abutment means on said platform at the edge thereof remote from the door whereby the lowermost package is prevented from outward movement relative to said door beyond a predetermined dispensing position in which the bottom of the package is open for grasping and lifting whereby the package may be lifted over said last named abutment means and out through said cut-out portion.

3. In combination with a door recess, a pair of vertically spaced substantially horizontal surfaces associated with said recess, at least two vertically disposed horizontally spaced dividers associated with said surfaces and projecting vertically through spaced apertures therein, each of said dividers having a flange therealong at the front edge thereof remote from the door for retaining packages between adjacent dividers and between said flanges and the door, a gap in the flange at the top of each divider to permit inserting packages behind said flanges and between said horizontal surfaces, means at the bottom of the dividers permitting removal of stacked packages one-by-one, said last named means including a cut-out portion in each of said flanges adjacent the bottom thereof, platform means at the bottom of each divider and projecting outwardly from said door and supporting the lateral ends of the bottom package, vertical abutment means on said platform at the front edge thereof preventing movement of the bottom package outward through the cut-out portion without first raising said package upwardly.

4. In combination with a door recess, a pair of vertically spaced substantially horizontal surfaces associated with said recess, at least two vertically disposed horizontally spaced dividers associated with said surfaces and projecting vertically through spaced apertures therein, each of said dividers having a flange therealong at the front edge thereof remote from the door for retaining packages between adjacent dividers and between said flanges and the door, a gap in the flange at the top of each divider to permit inserting packages behind said flanges and between said horizontal surfaces, means at the bottom of the dividers permitting removal of stacked packages one-by-one, said last named means including a cut-out portion in each of said flanges adjacent the bottom thereof, platform means at the bottom of each divider and projecting outwardly from said door and supporting the lateral ends of the bottom package, vertical abutment means on said platform at the front edge thereof preventing movement of the bottom package outward through the cut-out portion without first raising said package upwardly, each of said dividers having an integral resilient portion thereof adapted to be yieldably sprung into a collapsed position permitting the divider to be positioned in one of the spaced apertures in said vertically spaced surfaces and returned to a less collapsed position upon such positioning in said aperture for locking the divider in fixed position between said surfaces.

5. In combination with a door recess, a pair of vertically spaced substantially horizontal surfaces associated with said recess, at least two vertically disposed horizontally spaced dividers associated with said surfaces and projecting vertically through spaced apertures therein, each of said dividers having a flange therealong at the front edge thereof remote from the door for retaining packages between adjacent dividers and between said flanges and the door, a gap in the flange at the top of each divider to permit inserting packages behind said flanges and between said horizontal surfaces, means at the bottom of the dividers permitting removal of stacked packages one-by-one, said last named means including a cut-out portion in each of said flanges adjacent the bottom thereof, substantially horizontal platform means at the bottom of each divider for supporting the lateral ends only of the bottom package, vertical abutment flange means on said platform at the front edge thereof for preventing movement of the bottom package outward through the cut-out portion without first raising said package upwardly, each of said dividers having an integral resilient portion thereof formed by a removal of material adjacent one of said flanges whereby said portion may be yieldably sprung into a collapsed position in which the external dimensions of the divider are reduced thereby permitting the divider to be positioned in the spaced apertures in said vertically spaced surfaces and returned to a less collapsed condition upon such positioning for locking the divider in fixed position between said surfaces.

6. A divider of substantially T cross section comprising a bar and a retaining head flange extending along one edge of said bar substantially perpendicular thereto, the end portions of said flange being cut away, upper and lower projecting securing means at the ends of said divider, and a platform adjacent one end of said bar integral therewith, said lower securing means extending beyond said platform, said bar having a lengthwise slot in its other end dividing it into a relatively long positioning projection and a relatively short axially facing retaining abutment.

7. A divider of substantially T cross section comprising a bar and a retaining head flange extending along one edge of said bar substantially perpendicular thereto, the end portions of said flange being cut away, vertically extending flange abutment means secured to said bar at the bottom thereof and extending substantially parallel to said head flange but vertically removed therefrom, and an integral abutment finger at the other end of said bar, the latter having a laterally open recess adjacent said finger and said finger being resilient for movement into and away from said recess.

8. A divider of substantially T cross section comprising a vertical bar and a retaining head flange extending along the outer edge of said bar substantially perpendicular thereto, the upper and lower end portions of said flange being cut away, an upwardly extending securing element at the upper end of said bar, a platform at the lower end of said bar integrally attached thereto and provided at its outer end with an upwardly extending flange spaced vertically from said head flange, a downwardly extending securing element carried by said platform, and upper and lower retaining abutment elements at the ends of said divider respectively adjacent said securing elements, said divider having a slot therein between one of said retaining abutment elements and said bar, said divider being formed of resilient material and said one retaining abutment element being normally held in operative position spaced away from said bar by the inherent resiliency of the corresponding portion of said divider, said slot accommodating movement of said one retaining abutment element toward said bar to an inoperative position.

References Cited in the file of this patent

UNITED STATES PATENTS

| | | |
|---|---|---|
| Re. 19,092 | Despard | Feb. 20, 1934 |
| 368,426 | Ruttmann et al. | Aug. 16, 1887 |
| 653,699 | Robinson | July 17, 1900 |
| 695,473 | Morgan | Mar. 18, 1902 |
| 863,961 | Alexander | Aug. 20, 1907 |
| 1,097,409 | Fees et al. | May 19, 1914 |
| 1,298,848 | Wineberg | Apr. 1, 1919 |
| 1,464,343 | Scherer | Aug. 7, 1923 |
| 1,792,714 | Shields | Feb. 17, 1931 |
| 2,047,996 | Crosley et al. | July 21, 1936 |
| 2,436,577 | Kirby | Feb. 24, 1948 |
| 2,667,758 | Tenney et al. | Feb. 2, 1954 |
| 2,668,090 | Derr | Feb. 2, 1954 |

FOREIGN PATENTS

| | | |
|---|---|---|
| 73,312 | Austria | Apr. 25, 1917 |
| 294,803 | Great Britain | Aug. 2, 1928 |
| 670,984 | Great Britain | Apr. 30, 1952 |
| 675,412 | France | Nov. 7, 1929 |
| 914,964 | France | July 1, 1946 |